US009815254B2

(12) United States Patent
Blanchette et al.

(10) Patent No.: US 9,815,254 B2
(45) Date of Patent: Nov. 14, 2017

(54) LIGHTWEIGHT, HIGH FLOW HOSE ASSEMBLY AND METHOD OF MANUFACTURE

(71) Applicant: TEKNOR APEX COMPANY, Pawtucket, RI (US)

(72) Inventors: Gil Blanchette, E. Greenwich, RI (US); Michael Melo, North Dartmouth, MA (US); Steve Correa, Brownsville, TN (US); Timothy L. Chapman, Stanton, TN (US); Marlon Van Beek, Simpsonville, SC (US); John W. Parker, Jr., Memphis, TN (US); Paul Burke, Essex, VT (US); Ron Eilertson, Mansfield, MA (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 278 days.

(21) Appl. No.: 14/695,912

(22) Filed: Apr. 24, 2015

(65) Prior Publication Data
US 2016/0312926 A1   Oct. 27, 2016

(51) Int. Cl.
*F16L 11/00*   (2006.01)
*B32B 1/00*    (2006.01)
(Continued)

(52) U.S. Cl.
CPC .............. *B32B 1/00* (2013.01); *B32B 1/08* (2013.01); *F16L 11/10* (2013.01); *F16L 11/12* (2013.01);
(Continued)

(58) Field of Classification Search
USPC .................... 138/126, 109, 128, 171
See application file for complete search history.

(56) References Cited

U.S. PATENT DOCUMENTS 1,104,508 A    7/1914 Huthsing
2,612,910 A *  10/1952 Krupp ............... B29D 23/001
                                             138/128
(Continued)

FOREIGN PATENT DOCUMENTS

GB    904638    8/1962
GB    1017331   1/1966
(Continued)

OTHER PUBLICATIONS

International Search Report dated Jul. 18, 2016.
(Continued)

*Primary Examiner* — James Hook
(74) *Attorney, Agent, or Firm* — Hudak, Shunk & Farine Co., LPA

(57) ABSTRACT

A hose assembly, preferably a garden hose assembly, including a fabric jacketed tube that is lightweight, durable and versatile. The tube is radially expandable when pressurized by a fluid, such as water, but does not increase in length. The two layer construction of the hose assembly allows for storage in relatively compact spaces, similar flow rates, approximately one-half the weight, and improved maneuverability when compared to conventional hose constructions. In one embodiment the jacket is formed around the tube in a continuous process that welds a fabric, preferably using hot air, into the jacket. The welded joint forms a region of jacket that is preferably about twice the thickness of the rest of the jacket. This thicker region results in a stiffer section of jacket that makes the hose more controllable and consistent in use.

20 Claims, 3 Drawing Sheets

(51) Int. Cl.
*B32B 1/08* (2006.01)
*F16L 11/10* (2006.01)
*F16L 11/12* (2006.01)
*F16L 27/08* (2006.01)
*F16L 33/207* (2006.01)
*F16L 33/213* (2006.01)

(52) U.S. Cl.
CPC ......... *F16L 27/0812* (2013.01); *F16L 33/207* (2013.01); *F16L 33/213* (2013.01); *B32B 2307/50* (2013.01); *B32B 2307/546* (2013.01); *B32B 2597/00* (2013.01)

(56) References Cited

U.S. PATENT DOCUMENTS

| | | | | |
|---|---|---|---|---|
| 3,073,353 | A | * | 1/1963 | Rittenhouse ........... F16L 11/118 138/110 |
| D195,540 | S | | 6/1963 | Knight |
| 3,162,470 | A | | 12/1964 | Owens |
| 3,205,913 | A | * | 9/1965 | Ehlers ................ F16L 9/128 138/109 |
| 3,530,900 | A | * | 9/1970 | Kish .................. B25B 27/10 138/109 |
| D231,928 | S | | 6/1974 | Nelson |
| 3,885,593 | A | * | 5/1975 | Koerber .............. F16L 59/021 138/107 |
| 3,939,875 | A | | 2/1976 | Osborn et al. |
| 4,181,157 | A | * | 1/1980 | Decamp ................ F16L 57/04 138/103 |
| D254,505 | S | | 3/1980 | Parsons |
| 4,477,109 | A | | 10/1984 | Kleuver |
| 4,541,657 | A | | 9/1985 | Smyth |
| D283,342 | S | | 4/1986 | Tisserat |
| 4,850,620 | A | * | 7/1989 | Puls .................. F16L 33/213 138/109 |
| 4,929,478 | A | * | 5/1990 | Conaghan ............. F16L 57/06 138/103 |
| D334,046 | S | | 3/1993 | Klose |
| 5,195,563 | A | | 3/1993 | Brooks |
| 5,285,561 | A | | 2/1994 | Manning |
| 5,413,147 | A | | 5/1995 | Moreiras et al. |
| D368,304 | S | | 3/1996 | Morrison |
| D383,378 | S | | 9/1997 | Schrader |
| D387,146 | S | | 12/1997 | Morrison |
| D392,722 | S | | 3/1998 | Kurz |
| D413,657 | S | | 9/1999 | Lidgett |
| D413,968 | S | | 9/1999 | Lester |
| 6,024,132 | A | | 2/2000 | Fujimoto |
| 6,113,153 | A | | 9/2000 | Yang |
| 6,186,181 | B1 | | 2/2001 | Schippl |
| D483,096 | S | | 12/2003 | Gotoh |
| 6,948,527 | B2 | | 9/2005 | Ragner et al. |
| 7,168,451 | B1 | | 1/2007 | Dundas |
| D575,377 | S | | 8/2008 | Roman |
| D586,435 | S | | 2/2009 | Reckseen |
| 7,549,448 | B2 | | 6/2009 | Ragner et al. |
| D605,737 | S | | 12/2009 | Von Glanstaetten |
| D613,378 | S | | 4/2010 | Hinson |
| D613,780 | S | | 4/2010 | Henry et al. |
| D613,827 | S | | 4/2010 | Damaske |
| D631,351 | S | | 1/2011 | Coon |
| 7,887,662 | B2 | | 2/2011 | Wagner et al. |
| D642,245 | S | | 7/2011 | Mezzalira |
| 7,971,617 | B2 | | 7/2011 | Henry et al. |
| 7,975,633 | B2 | | 7/2011 | Henry et al. |
| D645,632 | S | | 9/2011 | Henry et al. |
| D648,502 | S | | 11/2011 | Henry et al. |
| D648,503 | S | | 11/2011 | Henry et al. |
| D650,052 | S | | 12/2011 | Drenth |
| 8,141,609 | B2 | | 3/2012 | Henry et al. |
| 8,211,262 | B2 | | 7/2012 | Henry et al. |
| D666,644 | S | | 9/2012 | Henry |
| 8,272,420 | B2 | | 9/2012 | Henry |
| 8,291,941 | B1 | | 10/2012 | Berardi |
| 8,291,942 | B2 | | 10/2012 | Berardi |
| D671,196 | S | | 11/2012 | Montalvo |
| 8,359,991 | B2 | | 1/2013 | Henry et al. |
| 8,371,143 | B2 | | 2/2013 | Ragner |
| D679,784 | S | | 4/2013 | Meyer |
| 8,453,701 | B2 | | 6/2013 | Henry |
| 8,479,776 | B2 | | 7/2013 | Berardi |
| D687,528 | S | | 8/2013 | Meyer |
| D691,261 | S | | 10/2013 | Kawamura |
| D693,393 | S | | 11/2013 | Henry |
| D705,284 | S | | 5/2014 | Nussbaum |
| D705,285 | S | | 5/2014 | Nussbaum |
| D706,904 | S | | 6/2014 | Faraon Chaul Huerta |
| 8,757,213 | B2 | | 6/2014 | Berardi |
| 8,776,836 | B2 | | 7/2014 | Ragner et al. |
| 8,826,838 | B2 | | 9/2014 | Henry et al. |
| D714,935 | S | | 10/2014 | Nishioka |
| D717,406 | S | | 11/2014 | Stanley |
| D717,848 | S | | 11/2014 | Henry et al. |
| 8,936,046 | B2 | | 1/2015 | Ragner |
| D722,681 | S | | 2/2015 | Berardi |
| 8,951,380 | B2 | | 2/2015 | Henry |
| D723,669 | S | | 3/2015 | Berardi |
| D724,186 | S | | 3/2015 | Berardi |
| D724,187 | S | | 3/2015 | Savage |
| 9,022,076 | B2 | | 5/2015 | Ragner et al. |
| D731,032 | S | | 6/2015 | Yang |
| D736,357 | S | | 8/2015 | Melo |
| D736,358 | S | | 8/2015 | Melo |
| D736,359 | S | | 8/2015 | Melo |
| D736,914 | S | | 8/2015 | Schultz |
| D738,471 | S | | 9/2015 | Melo |
| D739,493 | S | | 9/2015 | Wyne |
| D744,562 | S | | 12/2015 | Hassan |
| D744,563 | S | | 12/2015 | Hassan |
| D744,564 | S | | 12/2015 | Hassan |
| 9,279,525 | B2 | | 3/2016 | Berardi |
| D757,233 | S | | 5/2016 | Vaz |
| D760,363 | S | | 6/2016 | Yang |
| 2003/0111126 | A1 | | 6/2003 | Moulton |
| 2004/0256016 | A1 | * | 12/2004 | Arima .................... F16L 11/112 138/126 |
| 2008/0000540 | A1 | * | 1/2008 | Seyler .............. F02M 35/10137 138/126 |
| 2008/0262403 | A1 | * | 10/2008 | Martin ................. A41D 13/087 602/63 |
| 2010/0071795 | A1 | | 3/2010 | Montalvo |
| 2011/0083787 | A1 | | 4/2011 | Henry |
| 2012/0227363 | A1 | | 9/2012 | Nussbaum |
| 2013/0098887 | A1 | | 4/2013 | Henry |
| 2013/0113205 | A1 | | 5/2013 | Berardi |
| 2014/0007881 | A1 | | 1/2014 | Rummery et al. |
| 2014/0124125 | A1 | | 5/2014 | Nussbaum et al. |
| 2014/0124127 | A1 | | 5/2014 | Henry |
| 2014/0124136 | A1 | | 5/2014 | Nussbaum |
| 2014/0130930 | A1 | | 5/2014 | Ragner |
| 2014/0150889 | A1 | | 6/2014 | Ragner |
| 2014/0305586 | A1 | | 10/2014 | Hupp, Sr. |
| 2014/0305587 | A1 | | 10/2014 | Henry |
| 2014/0307987 | A1 | | 10/2014 | Henry |
| 2014/0345734 | A1 | | 11/2014 | Berardi |
| 2014/0374020 | A1 | | 12/2014 | Warnock, II |
| 2015/0007902 | A1 | | 1/2015 | Ragner |
| 2015/0041016 | A1 | | 2/2015 | Ragner |
| 2015/0129042 | A1 | | 5/2015 | Ragner |
| 2015/0219259 | A1 | | 8/2015 | Weems |
| 2015/0219260 | A1 | | 8/2015 | Kury |

FOREIGN PATENT DOCUMENTS

| | | |
|---|---|---|
| WO | 2014169057 A1 | 10/2014 |
| WO | 2015023592 A1 | 2/2015 |

OTHER PUBLICATIONS target.com, 50' HydroHose Compact Garden Hose and Nozzle—Saint Tropez, website pages, date unknown, 3 pages, Target.com, place of publication unknown.

(56) References Cited

OTHER PUBLICATIONS

Chapman, Declaration Regarding Test Results of HydroHose Brand Hose Assembly, Declaration, May 18, 2017, 1 page.

* cited by examiner

LIGHTWEIGHT, HIGH FLOW HOSE ASSEMBLY AND METHOD OF MANUFACTURE

FIELD OF THE INVENTION

The present invention relates to a hose assembly, preferably a garden hose assembly, including a fabric jacketed tube, that is lightweight, durable and versatile. The tube is circumferentially or radially expandable within the jacket when pressurized by a fluid, such as water, but does not increase in length in a preferred embodiment. The two layer construction of the hose assembly allows for storage in relatively compact spaces, similar flow rates, approximately one-half the weight, and improved maneuverability when compared to conventional hose constructions. In one embodiment, the jacket is formed around the tube in a continuous process that welds a fabric, preferably using hot air, into the jacket. The welded joint forms a region of jacket that is preferably about twice the thickness of the rest of the jacket. This thicker region results in a stiffer section of jacket that makes the hose more controllable and consistent in use.

BACKGROUND OF THE INVENTION

Numerous different types or styles of garden hoses are known in the art and commercially available.

For example, traditionally conventional hoses are polymeric and can be reinforced, have a substantially fixed longitudinal length, and have relatively low radial expansion upon internal application of fluid pressure. Due to their construction, some conventional hoses can be relatively heavy and cumbersome to use and store.

More recently, garden hoses longitudinally expandable along their length multiple times as compared to the length of the hose in an unpressurized or contracted state have been introduced. In some embodiments such hoses have a construction that includes a jacket that surrounds an expandable fluid conveying tube. Longitudinally and radially expandable hoses are popular for a variety of reasons including, but not limited to, lightweight construction and ease of storage when not in use.

Longitudinally expandable hoses are commercially available from a number of sources. The hoses are also described in various patents and publications, see for example: U.S. Pat. Nos. 6,948,527; 7,549,448; 8,371,143; 8,776,836; 8,291,942; 8,479,776; 8,757,213; as well as U.S. Patent Application Publication Nos. 2014/0150889; and 2014/0130930.

A problem with some of the length expandable hoses is that they can kink, bulge, fail and/or exhibit leakage, at one or more points along their length, for example at a connection point to a coupler or fitting at the end of the hose, after a number of expansion and contraction cycles.

SUMMARY OF THE INVENTION

The problems described above and others are solved by the hose assemblies of the present invention which are relatively lightweight, as compared to the traditionally conventional hoses, durable, and versatile. In some embodiments, the hose assemblies provide a flow rate similar to a conventional garden hose at approximately one-half the weight. The hose assemblies also provide improved maneuverability due to their light weight, kink resistance in view of the non-bonded, two-layer jacket construction and ease of storage over a conventional hose.

According to one embodiment or objective of the present invention, a hose assembly is disclosed comprising a lightweight elastomeric inner tube surrounded by a fabric-like outer tube that serves as a jacket for the inner tube. This jacket also prevents the length of the product from changing at different pressure conditions. The length of the product is fixed by the outer jacket. The inner tube can expand along a radial axis of the tube when pressure at or above a minimum fluid pressure is applied to the inner tube. When the pressure falls below the minimum fluid pressure, the inner tube of the hose assembly will contract radially. The outer tube limits the radial expansion of the inner tube and does not allow any substantial longitudinal expansion of the hose assembly in one embodiment.

Still another embodiment or objective of the present invention is to provide a hose assembly including a fabric outer tube that is welded around the inner tube and includes a weld seam extending along a longitudinal axis of the hose assembly. The weld seam has a greater thickness, i.e. wall thickness, as compared to a wall thickness of the unwelded fabric.

Yet another embodiment or objective of the present invention is to provide a method for producing a hose assembly comprising a hot air welding or seaming process whereby the outer tube is formed via welding, preferably hot air welding, around the inner tube, preferably utilizing a continuous process. It is possible for the circumferential size of the outer tube to be varied in order to produce hose assemblies having different maximum internal diameters of the inner tube.

An additional embodiment or objective of the present invention is to provide a method for producing a hose assembly comprising the steps of obtaining a polymeric or synthetic fabric, heating lateral sides of the fabric at or above a melting temperature thereof and bonding the lateral sides together around an inner tube in order to form a weld. As the fabric is bonded along the length of the inner tube, the outer tube is formed having a weld seam along the longitudinal length of the hose assembly. Advantageously, the process for preparing the hose assembly of the present invention allows manufacture of an outer tube having a weld that is stronger than the original fabric has relatively low labor costs and also produces a construction having the inner tube inserted into the outer tube as part of the welding process.

An additional embodiment or objective of the present invention is to provide a hose assembly capable of resisting water pressures in the 400 psi range (pounds per square inch) 2758 kPa. Even though the hose is of a robust construction, the assembly is relatively light in weight, for example about 4 lbs per 50 feet (0.12 kg per meter) in one preferred embodiment.

In one aspect, a hose assembly is disclosed, comprising an inner tube comprising an elastomeric material, wherein the inner tube has a longitudinal length and a first circumference below a minimum expansion pressure, wherein the inner tube and is expandable to a larger, second circumference upon application of fluid pressure on an inner surface of the inner tube at or above the minimum expansion pressure; and an outer tube covering the inner tube, the outer tube having a longitudinal length and a weld seam along the longitudinal length of the outer tube, the weld seam comprising melted fabric. The inner tube and outer fabric covering are the same length in a preferred embodiment.

In another aspect a process for producing a hose assembly is disclosed, comprising the steps of obtaining an inner tube comprising an elastomeric material; obtaining a fabric having a first end, a second end a first side and a second side, the sides located between the ends; wrapping the fabric around the inner tube and abutting the first side and the second side of the fabric, and heating the fabric to melt and bond the first side to the second side along a length of the side thereby forming an outer tube having a weld seam along a longitudinal length of the hose assembly, wherein during formation of the outer tube a section of the inner tube is located inside the outer tube.

BRIEF DESCRIPTION OF THE DRAWINGS

The invention will be better understood and other features and advantages will become apparent by reading the detailed description of the invention, taken together with the drawings, wherein.

DETAILED DESCRIPTION OF THE INVENTION

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other, independent, embodiments.

The hose assembly of the present invention includes a fabric jacketed inner tube, with the hose assembly being relatively light in weight, durable and versatile. The inner tube can expand circumferentially or radially to an expanded position or state in response to at least a minimum fluid pressure applied internally to the inner tube. The circumference of the fabric jacket controls radial expansion of the inner tube. The inner tube circumferentially or radially contracts when fluid pressure inside the tube falls below the minimum fluid pressure to a contracted or non-expanded position or state. In one embodiment, the outer tube jacket is formed around the inner tube in a continuous process that welds a fabric, preferably using hot air, into the jacket.

Figure 1:
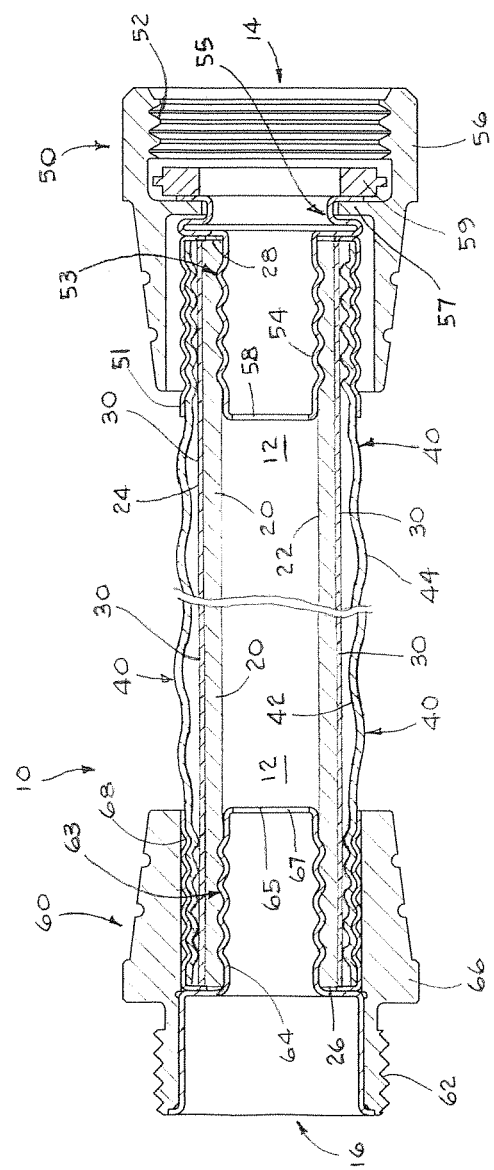
FIG. 1 is a partial, cross-sectional, longitudinal side view of one embodiment of a hose assembly of the present invention in a circumferentially contracted position.
Figure 2:
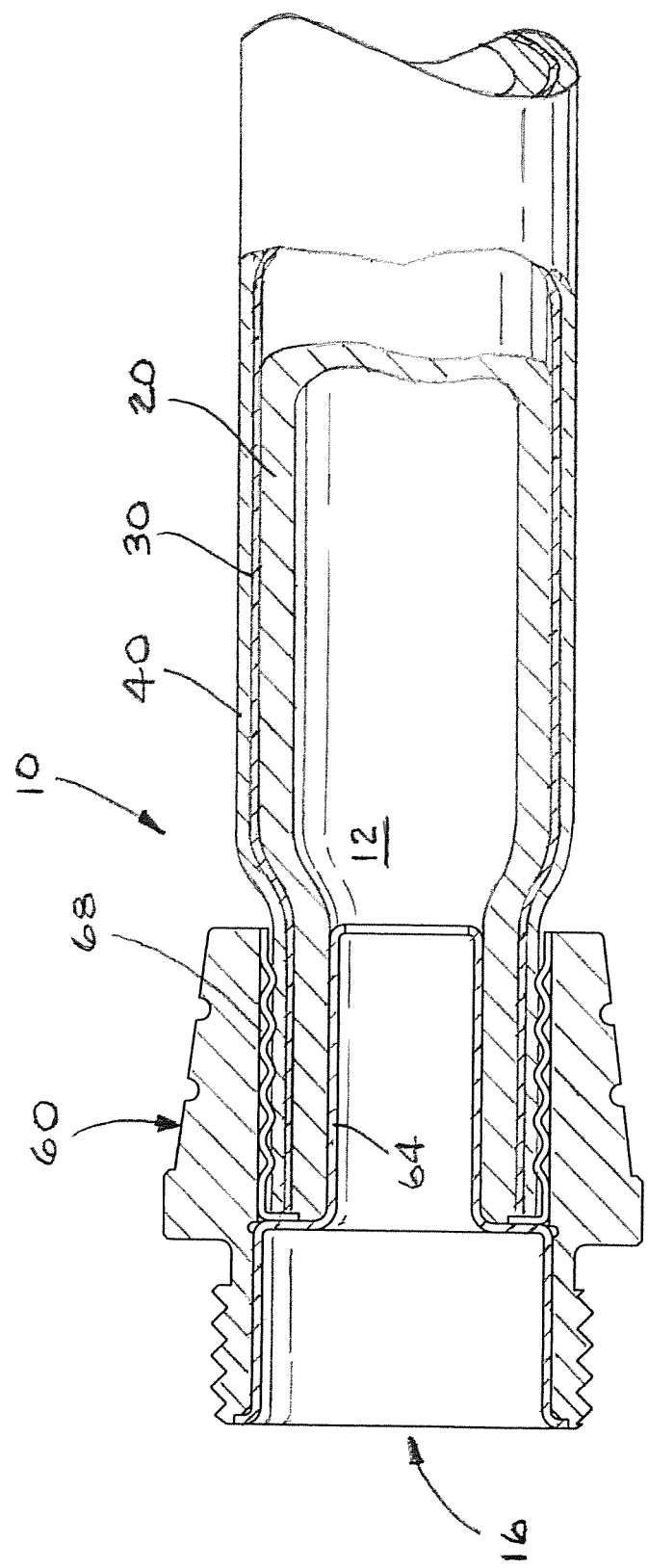
FIG. 2 is a partial, cross-sectional, longitudinal side view of one embodiment of a hose assembly of the present invention in a circumferentially expanded position.
Figure 3:
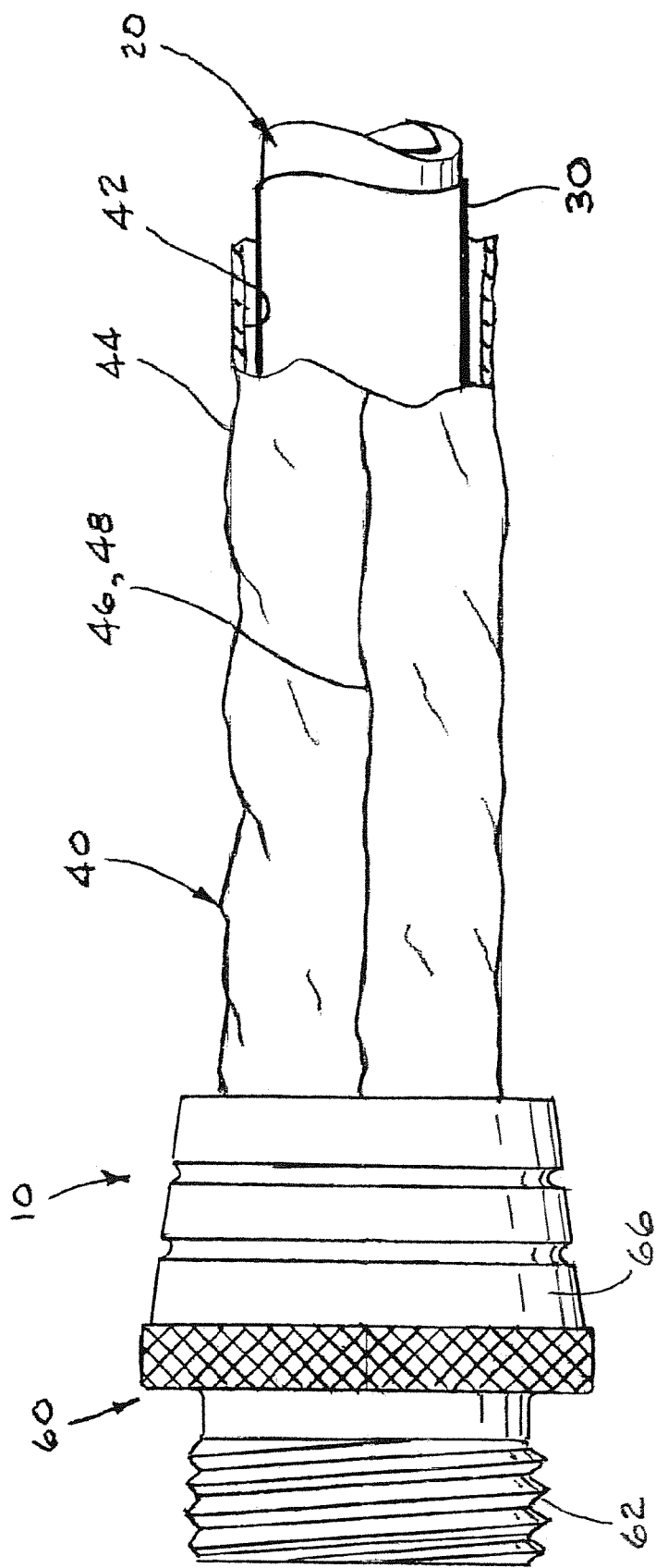
FIG. 3 is a partial, longitudinal side view of one embodiment of the hose assembly of the present invention particularly illustrating a weld seam of the outer tube produced by a hot air seaming method that encases an inner tube within the outer tube.

Referring now to the drawings wherein like reference numbers refer to like parts throughout the several views, a hose assembly 10 is illustrated in FIGS. 1 and 2, wherein FIG. 1 illustrates the hose assembly in an out-of-service or contracted position and FIG. 2 an expanded position. Hose assembly 10 includes an inlet 14 and an outlet 16, with fluid passage 12 being located therebetween. The hose assembly includes an inner tube 20 that extends between and fitting or couplers, see for example male coupler 60 and female coupler 50. The inner tube 20 is self-expanding and self-contracting. Inner tube 20 has an inner surface 22 and an outer surface 24, see FIGS. 1-2, for example. When a fluid, such as water when the hose assembly is utilized as a garden hose, is introduced into the inner tube 20 and exerts at least a minimum fluid pressure on an inner surface 22, the inner tube 20 expands, generally radially, from a first circumference to a larger, second circumference in an expanded position. Inner tube 20 can be formed such that the second circumference provides the tube inner surface 22 with a desired inner diameter, for example about 0.5 inch (1.27 cm) or about 0.625 inch (1.59 cm). When fluid pressure decreases below the minimum fluid pressure, the inner tube 20 relaxes or contracts radially, preferably back to the first circumference.

The thickness of the inner tube 20 can vary depending upon the materials utilized to construct the same. In various embodiments, the wall thickness of the inner tube ranges generally from about 1.0 to about 2.0 mm, desirably from about 1.2 to about 1.8 mm, preferably from about 1.40 to about 1.65 mm, as measured in a radial direction in a contracted position.

Hose assembly 10 also includes a jacket sheath or outer tube 40 that is also connected between first and second couplers, see for example male couplers 60 and female couplers 50. In one embodiment, the outer tube 40 is not connected or attached to the inner tube 20 or an outer slip coating layer 30, further described below, between the couplers. Stated in another manner, the outer tube 40 is preferably unattached, unconnected, unbonded, and unsecured to either the inner tube 20 or slip coating layer 30, when present, along the entire length of the inner tube 20 and slip coating layer 30 between the first end and the second end of the outer tuber 40, and thus the tube 40 is able to move freely with respect to the inner tube 20 and/or slip coating layer 30 when the hose assembly expands or contracts. In one embodiment, the circumferential or radial expansion of inner tube 20 is limited by the dimensions, i.e. maximum inner diameter or circumference of outer tube 40. The outer tube 40 is configured to protect the inner tube 20 and slip coating layer 30, when present, such as from cuts, friction, abrasion, puncture, over-expansion (bursting) or UV exposure.

In various embodiments the outer tube 40 can be braided or woven into a fabric that is subsequently formed into the tube. Suitable materials include, but are not limited to, polyolefins, polyesters, and polyamides such as nylon. Polyester is preferred in some embodiments. Outer tube 40 should be formed from a material that is pliable and strong enough to withstand a desired internal pressure that can be exerted by outer surface 24 of inner tube 20. Thickness of the outer tube 40 is dependent on yarn denier used. This will be dictated by desired internal pressure as mentioned above.

In an important aspect of the present invention, the hose assembly jacket or outer tube 40 is formed around the inner tube 20, preferably in a continuous process. In a preferred embodiment a hot air welding process is utilized. During the process, a piece of fabric having first and second ends and first and second sides located therebetween is formed into a tubular shape. A portion of the first side and the second side is heated to a temperature where the material, in particular polymer, that forms the fabric melts and the sides are bonded together, with the inner tube being present within or surrounded by the outer tube formed by the fabric. A weld 46 is formed in the area where the fabric is heated and the sides are joined. As the fabric is joined along the length of the sides, the welded fabric forms a spine or weld seam 48 extending longitudinally along the length of the fabric, comprising melted fabric. In a preferred embodiment, the weld seam has an overlap or weld width of 0.375 inch (9.5 mm)+/−0.0625 inch (+/−1.5 mm), generally measured perpendicular to the longitudinal length of the weld seam. In another embodiment, the variation is +/−3 mm. In one embodiment, the process that forms the welded seam is a continuous process that heats the fabric with hot air, with temperatures ranging between 550 and 750° C. and preferably between 600 and 700° C. The welding process also produces a weld seam having a wall thickness that is generally at least 50% greater, desirably at least 75% greater and preferably about 100% greater, i.e. two times greater, than the average thickness of the non-welded fabric of the outer tube.

In one embodiment, the inner tube 20 is supplied from a reel or spool. In another embodiment, the inner tube 20 is supplied directly from an upstream extrusion line. The inner tube enters a folding fixture which contains a series of guides and is combined with a flat, woven fabric. The fabric is supplied from a fabric source, such as a bulk container and straightened and tensioned as it enters the folding fixture. The folding fixture partially forms the fabric around the inner tube. The inner tube and fabric then enter a die which completes the forming process by shaping the fabric into a round, tubular shape. The tubular fabric profile and inner tube exit the die. At the exit of the die, a nozzle directs hot air between the overlapped fabric side surfaces. This hot air heats the fabric to or above its melting point just before the fabric and inner tube pass through a set of nip rollers which force the heated fabric surfaces against each other under pressure. A strong bond between the two fabric surfaces is formed at this point. The fabric and tube may be wound onto a reel for future assembly or cut to length and processed into a finished hose immediately. Hot air seaming devices are available from companies such as Miller Weldmaster of Navarre, Ohio.

Inner tube 20 can be formed from any suitable elastic material. Suitable materials include, but are not limited to, rubbers including natural rubber, synthetic rubber and combinations thereof; and various thermoplastic elastomers including thermoplastic vulcanizates. Suitable thermoplastic elastomers include but are not limited to styrenic block copolymers, for example SEBS, SEEPS, and SBS; and SIS. In one embodiment the inner tube has a hardness that ranges from 20 to 60 Shore A, desirably from 25 to 60 Shore A, and preferably from 30 to 50 Shore A, as measured according to ASTM D-2240.

The inner tube compositions of the present invention may include additional additives including, but not limited to antioxidants, foam agent, pigments, heat stabilizers, UV absorber/stabilizer, processing aids, flow enhancing agents, nanoparticles, platelet fillers and non-platelet fillers.

In some embodiments of the present invention, slip coating layer 30 is provided on outer surface 24 of inner tube 20, see FIGS. 1 and 2. In a preferred embodiment, the slip coating layer 30 can be extruded onto or coextruded with the inner tube 20 layer. Other application methods such as coating would also be acceptable so long as the slip coating performs its intended function.

The slip coating layer 30 can be a continuous or discontinuous layer or layers. In one preferred embodiment the slip coating layer is continuous, at least prior to a first expansion of inner tube 20 after the slip coating layer has been applied. Depending on the thickness of the slip coating layer 30 relatively thin layers, after one or more expansions of the inner tube 20, may exhibit cracking, splitting, crazing, fracturing or the like. Importantly though, such layers have still been found to be effective. That said, the initial thickness of the slip coating layer 30 ranges generally from about 0.025 mm to about 0.51 mm, desirably from about 0.05 to about 0.25 and preferably from about 0.10 to about 020 mm, or about 0.15 mm measured in a radial direction.

As illustrated in FIGS. 1 and 2, the slip coating layer 30 is located between the inner tube 20 and the outer tube covering 40. In a preferred embodiment, the slip coating layer is not directly connected to the outer tube covering 40 between the first coupler and the second coupler, e.g. male coupler 60 and female coupler 50, such that the outer tube covering 40 can slide or otherwise move in relation to the slip coating layer 30 during expansion and contraction of hose assembly 10. In an expanded position, the outer surface of the slip coating layer 30 is in contact with the inner surface of the outer tube covering 40.

The slip coating layer comprises a lubricant, optionally incorporated into or blended with a carrier material.

In one embodiment, the lubricant is a siloxane polymer or copolymer, or a fluorinated polymer or a combination thereof. A siloxane polymer masterbatch is available from Dow-Corning as MB50321™ and from Wacker as Genioplast™. Fluorinated polymer is available from McLube as MAC 1080™ In some embodiments lubricant is present in the slip coating layer in an amount generally from about 1 to about 40 parts, desirably from about 2 to about 30 parts and preferably in an amount from about 3 to about 20 parts based on 100 total parts by weight of the slip coating layer. In other embodiments, the lubricant can be a liquid, semi-solid or solid material that serves to reduce friction between the inner tube and the outer tube. Non-limiting examples of other lubricants include, but are not limited to, oils such as silicone oil, waxes, polymers, including elastomers.

As described herein, in one embodiment the lubricant is mixed with a carrier material that aids in affixing the lubricant on an outer surface of the inner tube. Suitable materials include, but are not limited to, polyolefins, thermoplastic elastomers or a combination thereof. In one embodiment, the carrier material comprises a polyolefin and one or more of the thermoplastic elastomers utilized in the inner tube layer.

Along with the lubricant, the slip coating layer may also include additional additives including, but not limited to, antioxidants, foaming agents, pigments, heat stabilizers, UV absorber/stabilizer, processing aids, flow enhancing agents, nanoparticles, platelet fillers and non-platelet fillers.

Hose assembly 10 includes male coupler 60 at a first end and female coupler 50 at a second end. The male coupler 60 includes an external threaded section 62 and an internal connector 63 fixedly connected, such as by a press fit, to main body 66 of male coupler 60. Connector 63 includes a stem 64 initially having a smaller diameter portion 63 that is connected to a larger diameter portion connected to the inner side of threaded section 62. Fluid passing through male coupler 60 passes through internal connector 63, generally through aperture 67 in stem 64 and out through the end of connector 63 within threaded section 62. In one embodiment, the stem 64 is inserted into the inner tube 20. A portion of the outer tube covering 40 is also located between stem 64, inner tube 20 and the ferrule 68 of male coupler 60. Inner tube 20 and outer tube 40 are operatively connected and secured to male coupler 60 by expansion of the stem 64 outwardly towards ferrule 68. In other embodiments the ferrule can be crimped towards a relatively rigid stem in order to capture the inner tube and outer tube therebetween, securing the tubes to the male coupler 60. Other attachment mechanisms could also be utilized.

The female coupler 50 includes a main body 56 having an internal threaded section 52 that is operatively and rotatably connected to a second end of hose assembly 10 opposite the end containing male coupler 60. Threaded section 52 is constructed such that it can be operatively connected to a male fitting of a spigot, faucet, or other similar valve control device.

The internal connector 53 of female coupler 50 is rotatable in relation to main body 56 such that the main body is also rotatable in relation to the inner tube 20 and outer tube 40 which are operatively connected or fixed to stem 54. A ferrule 51 is placed onto the jacket or outer tube 40 and inner tube 20. The ferrule 51, inner tube 20, and fabric jacket outer tube 40 are then fitted onto stem 63. Stem 63 is then expanded to secure the hose to the fitting. As mentioned above with respect to the male coupler, alternative constructions can be utilized to secure the inner tube 20 and outer tube 40 to the female coupler 50. As illustrated in FIG. 1, connector 53 includes a receptacle 55 in the form of a cavity, recess, or the like that accommodates flange 57 of the main body 56. In the embodiment illustrated, the flange 57 is a ring-like feature projecting inwardly from the main body 56 and includes an end that is located within receptacle 55. The flange structure allows the main body 56 to spin or rotate around connector 53. A washer 59 is located at the base of threaded section 52 in order to provide a desired seal between the female coupler and a device that is threadably connectable to threaded section 52.

Alternatively, other common couplers, fittings or hose end connections can be utilized and include, but are not limited, crimped (external), barbed, or clamped couplings made from plastics, metals, or combinations thereof.

The hose assembly 10 is illustrated in a contracted position with respect to circumference in FIG. 1. In this position, the elastic inner tube 20 is in a contracted or relaxed state with no internal force being applied to the inner surface 22 sufficient to expand or stretch inner tube 20. Depending on the material utilized for outer tube covering 40, space may exist between the same and the slip coating layer 30, if present, and/or inner tube 20 when the hose assembly is in a contracted position.

The fluid pressure within inner tube 20 can be increased for example by preventing fluid from being expelled through outlet 16, such as with the use of an associated nozzle or the like (not shown) and introducing fluid under pressure into the inlet 14 of hose assembly 10. Once a minimum threshold pressure is met or exceeded, the inner tube 20 undergoes circumferential expansion. Expansion of inner tube 20 results in a decrease in wall thickness of the inner tube and an increase in the circumference or diameter of the inner tube. Thus, a higher volume of fluid can be present in inner tube 20 in the expanded position as compared to the volume of fluid that can be present in a contracted position, below the minimum fluid pressure.

Depending upon the construction of the outer tube covering 40, in the expanded position, the covering may exhibit a relatively smooth, cylindrical character along its length, see FIG. 2 for example.

Standard water pressure for water exiting a spigot from a municipal water system is about 45 to about 75 psi (310.3 to 517.1 kPa) and typically about 60 psi, 413.7 kPa. Such pressure is sufficiently above a minimum fluid pressure required for the hose to expand. The minimum fluid pressure that causes the inner tube 20 of hose assembly 10 to expand will vary depending on the construction or composition thereof. When a nozzle or other flow restricting device is connected to the male coupler 60 of hose assembly 10, with the female coupler 70 being operatively connected to a spigot, the inner tube 20 will expand when the spigot valve is opened or turned on as water under pressure will flow into the hose. If the nozzle prevents the flow of fluid through the inner tube, the pressure inside the inner tube will achieve substantially the same pressure as that coming from the fluid pressure source, such as 60 psi (289.6 kPa) in the case of a standard municipal water supply. When fluid is released from the outlet 16 of hose assembly 10 through a suitable nozzle, the pressure inside the inner tube 20 is reduced. The hose assembly will remain in an expanded position when the fluid pressure remains above the minimum fluid pressure. In a preferred embodiment, the couplers are full flow fittings. They are not designed to create back pressure within the hose.

The hose assemblies formed by the present invention are relatively lightweight, when compared to a conventional garden hose. Hose assemblies of the present invention are capable of withstanding water pressures in the 400 psi (2758 kPa) range while still being relatively light. For example, a 50 foot hose assembly of the present invention including couplers or end fittings can weigh about 4 lbs. with inner and outer tubes that are about 50 feet in length. The hose assemblies are very flexible and can be easily stored in compact spaces that a conventional garden hose would not fit, such as a bucket or similar container. The hot air seaming or welding process according to the present invention allows manufacture of a hose assembly utilizing less labor input, while having the inner tube automatically inserted into the outer tube which is formed therearound as part of the welding process.

The hose assemblies of the present invention are particularly suitable for cold water applications.

Due to the flexibility and versatility of the hose assemblies, one can utilize a fastener system such as a hook and loop fastener system, for example VELCRO® to harness the hose assembly when not in use. A fastener strap can be attached to one end of the hose by threading an end of a fastener through a female eyelet thereof such that the fastener can be permanently affixed to the hose assembly.

The hose assemblies of the present invention can also be formed from FDA listed ingredients for non-food contact applications, such as RV and marine drinking water service.

EXAMPLES

Burst Testing

One embodiment of a garden hose assembly according to the present invention including a fabric outer tube having a weld seam formed from a hot air welding process, the weld seam extending along a longitudinal length of the outer tube, the weld seam comprising melted fabric, was pressurized to failure. The peak pressure was recorded. This product was comparable to heavy duty, conventional constructions.

Elevated Temperature Burst

Garden hose assemblies as described in the example above were burst tested at 120° F. to determine how they would perform in hot conditions. This inventive construction did not lose as much burst strength at high temperatures compared to existing constructions.

Puncture Resistance

A pointed penetrator was forced against a pressurized hose assembly as described above. The peak force required to form a leak was recorded. This construction was comparable to heavy duty, conventional constructions.

While in accordance with the patent statutes the best mode and preferred embodiment have been set forth, the scope of the invention is not limited thereto, but rather by the scope of the attached claims.

What is claimed is:

1. A hose assembly, comprising:
   an inner tube comprising an elastomeric material, wherein the inner tube has a longitudinal length and a first circumference below a minimum expansion pressure, wherein the inner tube is expandable to a larger, second circumference upon application of fluid pressure on an inner surface of the inner tube at or above the minimum expansion pressure; and
   an outer tube covering the inner tube, the outer tube having a longitudinal length and a weld seam along the longitudinal length of the outer tube, the weld seam comprising melted fabric, wherein the hose assembly further includes a male coupler connected to first ends of the inner tube and the outer tube and a female coupler connected to second ends of the inner tube and the outer tube, and wherein the outer tube is not connected or attached to the inner tube between the male coupler and the female coupler.

2. The hose assembly according to claim 1, wherein the outer tube has a first end and a second end and two sides between ends, wherein the two sides are bonded at the weld seam, and wherein the outer tube has a fixed longitudinal length.

3. The hose assembly according to claim 1, wherein the outer tube has an inner surface with a circumference and the second circumference of the inner tube is less than or equal to the outer tube inner surface circumference.

4. The hose assembly according to claim 1, wherein a slip coating layer comprising a lubricant is present on an outer surface of the inner tube.

5. The hose assembly according to claim 1, wherein the weld seam has a weld width of 9.5 mm+/−3.0 mm, and wherein the weld seam has a weld thickness that is at least 50% greater than a thickness of the fabric of the outer tube in a non-weld seam section.

6. The hose assembly according to claim 5, wherein the weld seam weld width is 9.5 mm+/−1.50 mm, and wherein the weld thickness is at least 75% greater than the thickness of the fabric of the outer tube in the non-weld seam section.

7. The hose assembly according to claim 6, wherein the weld seam weld thickness is at least 100% greater than the thickness of the fabric of the outer tube in the non-weld seam section.

8. A process for producing the hose assembly according to claim 1, comprising:
   obtaining the inner tube comprising the elastomeric material;
   obtaining a fabric having a first end, a second end, a first side and a second side, the sides located between the ends;
   wrapping the fabric around the inner tube and abutting the first side and the second side of the fabric, and
   heating the fabric to melt and bond the first side to the second side along a length of the sides thereby forming the outer tube having the weld seam along the longitudinal length of the hose assembly, wherein during formation of the outer tube a section of the inner tube is located inside the outer tube.

9. The process according to claim 8, further including the step of overlapping the first side and the second side of the fabric 9.5 mm+/−3.0 mm.

10. The process according to claim 9, further including the step of overlapping the first side and the second side of the fabric 9.5 mm+/−1.5 mm.

11. The process according to claim 9, wherein the heating step comprises heating the fabric with hot air at a temperature between 550° C. and 750° C.

12. The process according to claim 11, further including the step of partially forming the fabric around the inner tube with a folding fixture and shaping the fabric into a round, tubular profile using a die.

13. The process according to claim 12, further including a step of passing the inner tube and outer tube through a set of rollers which force the heated fabric surfaces against each other under pressure after the heating step.

14. The process according to claim 8, wherein the heating step comprises heating the fabric with hot air at a temperature between 550° C. and 750° C.

15. The process according to claim 14, further including the step of partially forming the fabric around the inner tube with a folding fixture and shaping the fabric into a round, tubular profile using a die.

16. The process according to claim 15, further including a step of passing the inner tube and outer tube through a set of rollers which force the heated fabric surfaces against each other under pressure after the heating step.

17. A hose assembly, comprising:
   an inner tube comprising an elastomeric material, wherein the inner tube has a longitudinal length and a first circumference below a minimum expansion pressure, wherein the inner tube is expandable to a larger, second circumference upon application of fluid pressure on an inner surface of the inner tube at or above the minimum expansion pressure; and
   an outer tube covering the inner tube, the outer tube having a longitudinal length and a weld seam along the longitudinal length of the outer tube, the weld seam consisting of melted fabric, wherein the hose assembly further includes a male coupler connected to first ends of the inner tube and the outer tube and a female coupler connected to second ends of the inner tube and the outer tube, and wherein the outer tube is not connected or attached to the inner tube between the male coupler and the female coupler.

18. The hose assembly according to claim 17, wherein the outer tube has a first end and a second end and two sides between ends, wherein the two sides are bonded at the weld seam, and wherein the outer tube has a fixed longitudinal length.

19. The hose assembly according to claim 18, wherein the weld seam has a weld width of 9.5 mm+/−3.0 mm, and wherein the weld seam has a weld thickness that is at least 50% greater than a thickness of the fabric of the outer tube in a non-weld seam section.

20. The hose assembly according to claim 19, wherein the weld seam weld width is 9.5 mm+/−1.50 mm, and wherein the weld thickness is at least 75% greater than the thickness of the fabric of the outer tube in the non-weld seam section.

* * * * *